(12) United States Patent
Gulbani et al.

(10) Patent No.: US 10,582,417 B2
(45) Date of Patent: Mar. 3, 2020

(54) SENDING MULTIPLE G-PDUS WITH A SINGLE UDP DATAGRAM

(71) Applicant: Nokia Solutions and Networks Oy, Espoo (FI)

(72) Inventors: Giorgi Gulbani, Espoo (FI); Jan Frey, Munster (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/573,675

(22) PCT Filed: May 11, 2015

(86) PCT No.: PCT/EP2015/060285
§ 371 (c)(1),
(2) Date: Nov. 13, 2017

(87) PCT Pub. No.: WO2016/180459
PCT Pub. Date: Nov. 17, 2016

(65) Prior Publication Data
US 2018/0132134 A1 May 10, 2018

(51) Int. Cl.
*H04L 12/801* (2013.01)
*H04L 5/14* (2006.01)
(Continued)

(52) U.S. Cl.
CPC ........... *H04W 28/065* (2013.01); *H04L 69/08* (2013.01); *H04L 69/16* (2013.01); *H04L 69/169* (2013.01);
(Continued)

(58) Field of Classification Search
CPC ..... H04L 28/065; H04L 69/326; H04L 69/16; H04L 69/08; H04L 69/169
See application file for complete search history.

(56) References Cited

U.S. PATENT DOCUMENTS 6,973,072 B1 * 12/2005 Muntz .................... H04L 45/60
370/351
2005/0276249 A1 * 12/2005 Damnjanovic ....... H04L 1/1841
370/335
(Continued)

FOREIGN PATENT DOCUMENTS

CN   101388825 A  *  3/2009  ............... H04L 5/14
CN   101388825 A     3/2009
(Continued)

OTHER PUBLICATIONS

CN-101388825, Huawei Tech Co Ltd (Pub date: Mar. 18/209), (Year: 2009).*
(Continued)

*Primary Examiner* — Faruk Hamza
*Assistant Examiner* — Abusayeed M Haque
(74) *Attorney, Agent, or Firm* — Harrington & Smith

(57) ABSTRACT

Plural packet data units are encapsulated into a datagram of a user datagram protocol. Each of the plural packet data units includes a respective header of a tunneling protocol and a respective user data packet. Each of the headers indicates a length of the respective packet data unit. The plural packet data units include a first packet data unit and are arranged in the datagram in an order starting with the first packet data unit. It is informed, by at least the header of the first packet data, that the encapsulating encapsulates the plural packet data units into the datagram.

16 Claims, 1 Drawing Sheet

(51) Int. Cl.
*H04L 29/06* (2006.01)
*H04W 28/06* (2009.01)
*H04L 29/08* (2006.01)
*H04W 80/06* (2009.01)

(52) U.S. Cl.
CPC .......... *H04L 69/326* (2013.01); *H04L 69/164* (2013.01); *H04L 2212/00* (2013.01); *H04W 80/06* (2013.01)

(56) References Cited

U.S. PATENT DOCUMENTS

| | | | | |
|---|---|---|---|---|
| 2006/0064579 | A1* | 3/2006 | Aaron | H04L 63/04 713/150 |
| 2008/0192858 | A1* | 8/2008 | Kim | H04L 12/189 375/295 |
| 2011/0305307 | A1* | 12/2011 | Wang | H04J 3/0667 375/362 |
| 2012/0140733 | A1* | 6/2012 | Jung | H04W 36/0077 370/331 |
| 2013/0028336 | A1* | 1/2013 | Limberg | H04N 21/2383 375/240.27 |
| 2014/0153572 | A1* | 6/2014 | Hampel | H04L 12/6418 370/392 |
| 2014/0348140 | A1* | 11/2014 | Atkinson | H04L 12/417 370/336 |
| 2015/0276230 | A1* | 10/2015 | Chen | F24C 3/124 137/624.12 |
| 2016/0309379 | A1* | 10/2016 | Pelletier | H04W 76/27 |
| 2017/0064371 | A1* | 3/2017 | Kitazato | H04N 5/278 |

FOREIGN PATENT DOCUMENTS

| | | |
|---|---|---|
| JP | 2013/207514 A | 10/2013 |
| JP | 2013207514 A * | 10/2013 ............... H04L 5/14 |

OTHER PUBLICATIONS

Ericsson TSGR3#15(00)2097, IP UTRAN transport user plane protocol; 2000;.

3GPP TS 23.060 V13.1.0 (Dec. 2014); 3rd Generation Partnership Project; Technical Specification Group Services and System Aspects; General Packet Radio Service (GPRS); Service description; Stage 2 (Release 13).

3GPP TS 23.380 V12.1.0 (Dec. 2014); 3rd Generation Partnership Project; Technical Specification Group Core Network and Terminals; IMS Restoration Procedures (Release 12).

3GPP TS 23.401 V13.1.0 (Dec. 2014); 3rd Generation Partnership Project; Technical Specification Group Services and System Aspects; General Packet Radio Service (GPRS) enhancements for Evolved Universal Terrestrial Radio Access Network (E-UTRAN) access (Release 13).

3GPP TS 25.413 V12.3.0 (Dec. 2014); 3rd Generation Partnership Project; Technical Specification Group Radio Access Network; UTRAN Iu interface Radio Access Network Application Part (RANAP) signaling (Release 12).

3GPP TS 29.060 V12.7.0 (Dec. 2014); 3rd Generation Partnership Project; Technical Specification Group Core Network and Terminals; General Packet Radio Service (GPRS); GPRS Tunnelling Protocol (GTP) across the Gn and Gp interface (Release 12).

3GPP TS 29.274 V13.0.0 (Dec. 2014); 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13).

3GPP TS 29.281 V12.1.0 (Dec. 2014); 3rd Generation Partnership Project; Technical Specification Group Core Network and Terminals; General Packet Radio System (GPRS) Tunnelling Protocol User Plane (GTPv1-U) (Release 12).

3GPP TS 32.295 V12.2.0 (Dec. 2014); 3rd Generation Partnership Project; Technical Specification Group Services and System Aspects; Telecommunication management; Charging management; Charging Data Record (CDR) transfer (Release 12).

3GPP TS 36.413 V12.4.0 (Dec. 2014); 3rd Generation Partnership Project; Technical Specification Group Radio Access Network; Evolved Universal Terrestrial Radio Access Network (E-UTRAN); S1 Application Protocol (S1AP) (Release 12).

Wikipedia; Asynchronous Transfer Mode; dated Dec. 31, 2014 https://web.archive.org/web/20141231234216/http://en.wikipedia.org/wiki/Asynchronous_Transfer_Mode.

Wikipedia; Packet aggregation; dated Nov. 4, 2014; https://web.archive.org/web/20141104090340/http://en.wikipedia.org/wiki/Packet_aggregation.

* cited by examiner

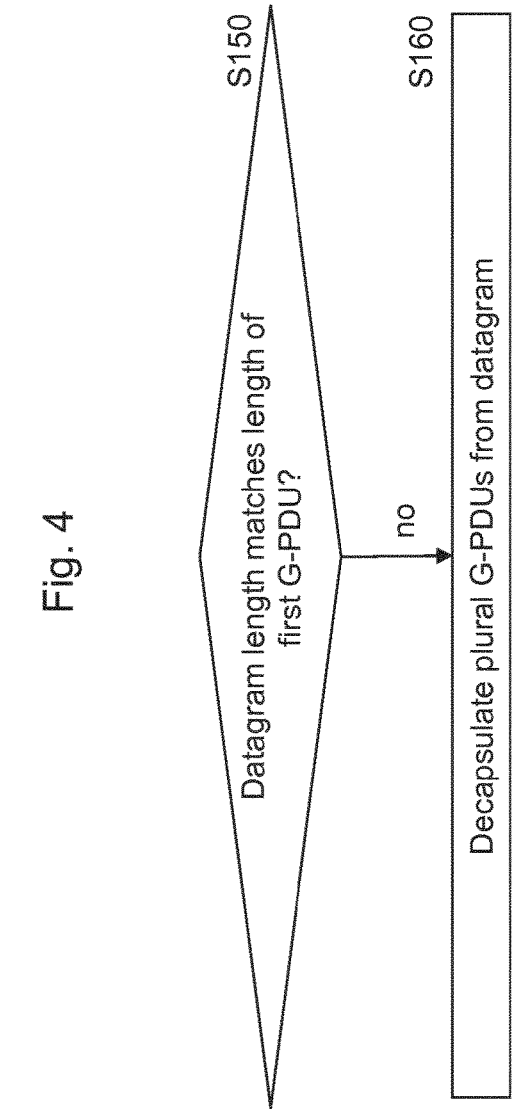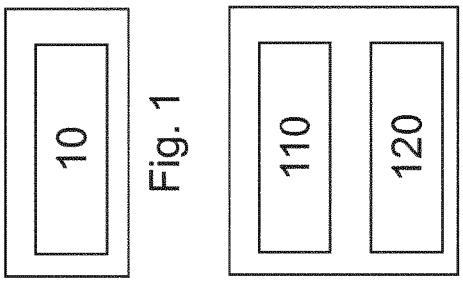

SENDING MULTIPLE G-PDUS WITH A SINGLE UDP DATAGRAM

FIELD OF THE INVENTION

The present invention relates to an apparatus, a method, and a computer program product related to GTP interfaces. More particularly, the present invention relates to an apparatus, a method, and a computer program product related to transmission of GTP PDUs via UDP.

Abbreviations

3GPP 3rd Generation Partnership Project
APN Access Point Name
ASN.1 Abstract Syntax Notation One
CDMA Code Division Multiple Access
CP Control Plane
EDGE Enhanced Datarate for GSM Evolution
eNB evolved NodeB
EPC Evolved Packet Core
ePDG Evolved packet Data Gateway
E-RAB Evolved RAB
F-TEID Fully qualified TEID
F-TEID-U F-TEID user plane
G-PDUGTP PDU
GGSN Gateway GPRS Support Node
GPRS General Packet Radio Service
GSM Global System for Mobile Communication
GTP GPRS Tunneling Protocol
GTP-C GTP control plane
GTP-U GTP user plane
IE Information Element
IP Internet Protocol
IPsec IP security
LTE Long Term Evolution
LTE-A LTE Advanced
MME Mobility Management Entity
MTU Maximum Transfer Unit
O&M Operation & Maintenance
PDN Packet Data Network
PDU Packet Data Unit
PGW Packet Date Network Gateway
PLMN Public Land Mobile Network
QoS Quality of Service
RAB Radio Access Bearer
RAN Radio Access Network
RANAP RAN Application Part
RNC Radio Network Controller
S1AP S1 Application Part
SGSN Serving GPRS Support Node
SGW Serving Gateway
TCP Transmission Control Protocol
TEID Tunnel Endpoint Identifier
TEID-C TEID (for) control plane
TEID-U TEID (for) user plane
T-PDU Transport PDU
TS Technical Specification
TWAG Trusted Wireless Access Gateway within TWAN
TWAN Trusted Wireless Access Network
UDP User Datagram Protocol
UMTS Universal Mobile Telecommunications System
UP User Plane
VoLTE Voice over LTE
WiFi Wireless Fidelity
WLAN Wireless Local Area Network Glossary F-TEID: This is GTPv2 IE and contains IP addresses (IPv4, or IPv6, or both), TEID and also Interface Type fields. GTPv1 does not have such IE, but IP address and TEID values are sent as separate IEs. In this application, for convenience F-TEID is used when describing matters common for both protocol flavours GTPv1 and GTPv2.
G-PDU: User data packet (T-PDU) plus GTP-U header, sent between GTP-U network nodes.
GTPv1-C: GTP protocol flavour for control plane, which is specified in 3GPP TS 29.060. GTPv1-C is used in legacy PS domain networks across Gn-C/Gp-C interfaces.
GTPv1-U/GTP-U: GTP protocol flavour for user plane, which is specified in 3GPP TS 29.281. GTPv1-U/GTP-U is used in user plane across Gn-U/Gp-U, S1-U, S2-U, S3-U, S4-U, S5-U/S8-U, S10-U, S12 and S16-U interfaces.
GTPv2: GTP protocol flavour for control plane, which is specified in 3GPP TS 29.274. GTPv2 is used in EPC networks across S2-C, S3-C, S4-C, S5-C/S8-C, S10-C, S11 and S16-C interfaces.
GTP Tunnel: A GTP tunnel is a communication tunnel between two GTP entities.
PDN connection: The association between a UE represented by one IPv4 address and/or one IPv6 prefix and a PDN represented by an APN.
TEID: Tunnel Endpoint Identifier information element, which identifies one end of a GTP tunnel.

BACKGROUND OF THE INVENTION

3GPP TS 23.060, Annex C "Link MTU consideration", describes various encapsulation overheads for user plane datagram. According to 3GPP TS23.060, the overhead becomes larger than the actual datagram for VoLTE payload, which is typically about 40-50 octets long. That is, encapsulation overhead for e.g. VoLTE payloads in EPC networks is unreasonably large. A high amount of small packets leads to scalability issues in various network devices.

SUMMARY OF THE INVENTION

It is an object of the present invention to improve the prior art.

According to a first aspect of the invention, there is provided an apparatus, comprising encapsulating means adapted to encapsulate plural packet data units into a datagram of a user datagram protocol, wherein each of the plural packet data units comprises a respective header of a tunneling protocol and a respective user data packet, and each of the headers indicates a length of the respective packet data unit.

The plural packet data units may include a first packet data unit and may be arranged in the datagram in an order starting with the first packet data unit; and the apparatus may further include informing means adapted to inform, by at least the header of the first packet data, that the encapsulating means encapsulates the plural packet data units into the datagram.

The informing means may be adapted to inform that the encapsulating means encapsulates the plural packet data units into the datagram by setting a predefined bit in the header of the first packet data unit.

The informing means may be adapted to inform that the encapsulating means encapsulates the plural packet data units into the datagram by extending the header of the first packet data unit with a predefined extension header.

The plural packet data units may include a last packet data unit and may be arranged in the datagram in an order ending with the last packet data unit; and the informing means may be adapted to inform that the encapsulating means encapsulates the plural packet data units into the datagram in the headers of all of the plural packet data units except for the last packet data unit.

The apparatus may further comprise comparing means adapted to compare the respective length of each of the plural packet data units with a length threshold; inhibiting means adapted to inhibit the encapsulating means from encapsulating the plural packet data units into the datagram if at least one of the lengths exceeds the length threshold.

The apparatus may further comprise checking means adapted to check if an indication is stored that an intended receiver of the datagram is adapted to decapsulate the plural packet data units out of the datagram; prohibiting means adapted to prohibit, if the indication is not stored, that the encapsulating means encapsulates the plural packet data units into the datagram.

The apparatus may be adapted to receive the indication in a control message related to setting up a bearer for bearing the datagram, wherein the control message may be at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

According to a second aspect of the invention, there is provided an apparatus, comprising monitoring means adapted to monitor if a first header included in a received datagram of a user datagram protocol includes an information that plural packet data units are encapsulated in the datagram; decapsulating means adapted to decapsulate, if the first header includes the information, the plural packet data units from the datagram, wherein each of the plural packet data units includes a respective header of a tunneling protocol and a respective user data packet, each of the headers indicates a length of the respective user data packet, and a first packet data unit of the plural packet data units is arranged first in the datagram and includes the first header as the respective header.

The monitoring means may be adapted to monitor that the first header includes the information if a predefined bit is set in the first header.

The monitoring means may be adapted to monitor that the first header includes the information if the first header is extended by a predefined extension header.

The decapsulating means may be adapted to decapsulate the plural packet data units in a sequence according to an arrangement of the packet data units in the datagram; and the apparatus may further comprise detecting means adapted to detect if the packet data unit decapsulated last by the decapsulating means includes the information; stopping means adapted to stop the decapsulating by the decapsulating means if the packet data unit decapsulated last does not include the information.

According to a third aspect of the invention, there is provided an apparatus, comprising comparing means adapted to compare a datagram length of a received datagram of a user datagram protocol with a first packet data unit length of a first packet data unit; decapsulating means adapted to decapsulate, if the datagram length and the first packet data unit length do not match, a second packet data unit from the datagram, wherein the first packet data unit is encapsulated in the datagram; the first packet data unit includes a first header of a tunneling protocol and a first user data packet; the first header indicates the first packet data unit length of the first packet data unit; the second packet data unit includes a second header of the tunneling protocol and a second user data packet, the second header indicates a second packet data unit length of the second packet data unit, and the second packet data unit is different from the first packet data unit.

The decapsulating means may be adapted to decapsulate further packet data units from the datagram until all packet data units encapsulated in the datagram are decapsulated, wherein each of the further packet data units may include a respective further header of the tunneling protocol and a respective further user data packet, each of the further headers may indicate a packet data unit length of the respective further packet data unit; and each of the further packet data units may be different from the first packet data unit.

The apparatus according to each of the second and third aspects may further comprise indicating means adapted to indicate that the apparatus includes the decapsulating means.

The apparatus according to each of the second and third aspects may further comprise monitoring means adapted to monitor if a user plane bearer for bearing the datagram is being set up; wherein the indicating means may be adapted to indicate, if the user plane bearer is being set up, in a control message related to the setting up of the user plane bearer, that the apparatus includes the decapsulating means. The control message may be at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

According to a fourth aspect of the invention, there is provided an apparatus, comprising encapsulating circuitry configured to encapsulate plural packet data units into a datagram of a user datagram protocol, wherein each of the plural packet data units comprises a respective header of a tunneling protocol and a respective user data packet, and each of the headers indicates a length of the respective packet data unit.

The plural packet data units may include a first packet data unit and may be arranged in the datagram in an order starting with the first packet data unit; and the apparatus may further include informing circuitry configured to inform, by at least the header of the first packet data, that the encapsulating circuitry encapsulates the plural packet data units into the datagram.

The informing circuitry may be configured to inform that the encapsulating circuitry encapsulates the plural packet data units into the datagram by setting a predefined bit in the header of the first packet data unit.

The informing circuitry may be configured to inform that the encapsulating circuitry encapsulates the plural packet data units into the datagram by extending the header of the first packet data unit with a predefined extension header.

The plural packet data units may include a last packet data unit and may be arranged in the datagram in an order ending with the last packet data unit; and the informing circuitry may be configured to inform that the encapsulating circuitry encapsulates the plural packet data units into the datagram in the headers of all of the plural packet data units except for the last packet data unit.

The apparatus may further comprise comparing circuitry configured to compare the respective length of each of the plural packet data units with a length threshold; inhibiting circuitry configured to inhibit the encapsulating circuitry from encapsulating the plural packet data units into the datagram if at least one of the lengths exceeds the length threshold.

The apparatus may further comprise checking circuitry configured to check if an indication is stored that an intended receiver of the datagram is configured to decapsulate the plural packet data units out of the datagram; prohibiting circuitry configured to prohibit, if the indication is not stored, that the encapsulating circuitry encapsulates the plural packet data units into the datagram.

The apparatus may be configured to receive the indication in a control message related to setting up a bearer for bearing the datagram, wherein the control message may be at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

According to a fifth aspect of the invention, there is provided an apparatus, comprising monitoring circuitry configured to monitor if a first header included in a received datagram of a user datagram protocol includes an information that plural packet data units are encapsulated in the datagram; decapsulating circuitry configured to decapsulate, if the first header includes the information, the plural packet data units from the datagram, wherein each of the plural packet data units includes a respective header of a tunneling protocol and a respective user data packet, each of the headers indicates a length of the respective user data packet, and a first packet data unit of the plural packet data units is arranged first in the datagram and includes the first header as the respective header.

The monitoring circuitry may be configured to monitor that the first header includes the information if a predefined bit is set in the first header.

The monitoring circuitry may be configured to monitor that the first header includes the information if the first header is extended by a predefined extension header.

The decapsulating circuitry may be configured to decapsulate the plural packet data units in a sequence according to an arrangement of the packet data units in the datagram; and the apparatus may further comprise detecting circuitry configured to detect if the packet data unit decapsulated last by the decapsulating circuitry includes the information; stopping circuitry configured to stop the decapsulating by the decapsulating circuitry if the packet data unit decapsulated last does not include the information.

According to a sixth aspect of the invention, there is provided an apparatus, comprising comparing circuitry configured to compare a datagram length of a received datagram of a user datagram protocol with a first packet data unit length of a first packet data unit; decapsulating circuitry configured to decapsulate, if the datagram length and the first packet data unit length do not match, a second packet data unit from the datagram, wherein the first packet data unit is encapsulated in the datagram; the first packet data unit includes a first header of a tunneling protocol and a first user data packet; the first header indicates the first packet data unit length of the first packet data unit; the second packet data unit includes a second header of the tunneling protocol and a second user data packet, the second header indicates a second packet data unit length of the second packet data unit, and the second packet data unit is different from the first packet data unit.

The decapsulating circuitry may be configured to decapsulate further packet data units from the datagram until all packet data units encapsulated in the datagram are decapsulated, wherein each of the further packet data units may include a respective further header of the tunneling protocol and a respective further user data packet, each of the further headers may indicate a packet data unit length of the respective further packet data unit; and each of the further packet data units may be different from the first packet data unit.

The apparatus according to each of the fifth and sixth aspects may further comprise indicating circuitry configured to indicate that the apparatus includes the decapsulating circuitry.

The apparatus according to each of the fifth and sixth aspects may further comprise monitoring circuitry configured to monitor if a user plane bearer for bearing the datagram is being set up; wherein the indicating circuitry may be configured to indicate, if the user plane bearer is being set up, in a control message related to the setting up of the user plane bearer, that the apparatus includes the decapsulating circuitry. The control message may be at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

According to a seventh aspect of the invention, there is provided a method, comprising encapsulating plural packet data units into a datagram of a user datagram protocol, wherein each of the plural packet data units comprises a respective header of a tunneling protocol and a respective user data packet, and each of the headers indicates a length of the respective packet data unit.

The plural packet data units may include a first packet data unit and may be arranged in the datagram in an order starting with the first packet data unit; and the method may further include informing, by at least the header of the first packet data, that the plural packet data units are encapsulated into the datagram.

The informing that the plural packet data units are encapsulated into the datagram may be performed by setting a predefined bit in the header of the first packet data unit.

The informing that the plural packet data units are encapsulated into the datagram may be performed by extending the header of the first packet data unit with a predefined extension header.

The plural packet data units may include a last packet data unit and may be arranged in the datagram in an order ending with the last packet data unit; and the headers of all of the plural packet data units except for the last packet data unit may inform that the plural packet data units are encapsulated into the datagram.

The method may further comprise comparing the respective length of each of the plural packet data units with a length threshold; inhibiting the encapsulating of the plural packet data units into the datagram if at least one of the lengths exceeds the length threshold.

The method may further comprise checking if an indication is stored that an intended receiver of the datagram is adapted to decapsulate the plural packet data units out of the datagram; prohibiting, if the indication is not stored, that the plural packet data units are encapsulated into the datagram.

The method may be configured to receive the indication in a control message related to setting up a bearer for bearing the datagram, wherein the control message may be at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

According to an eighth aspect of the invention, there is provided a method, comprising monitoring if a first header included in a received datagram of a user datagram protocol includes an information that plural packet data units are encapsulated in the datagram; decapsulating, if the first header includes the information, the plural packet data units from the datagram, wherein each of the plural packet data units includes a respective header of a tunneling protocol and a respective user data packet, each of the headers indicates a length of the respective user data packet, and a first packet data unit of the plural packet data units is arranged first in the datagram and includes the first header as the respective header.

It may be monitored that the first header includes the information if a predefined bit is set in the first header.

It may be monitored that the first header includes the information if the first header is extended by a predefined extension header.

The plural packet data units may be decapsulated in a sequence according to an arrangement of the packet data units in the datagram; and the method may further comprise detecting if the packet data unit decapsulated last includes the information; stopping the decapsulating if the packet data unit decapsulated last does not include the information.

According to a ninth aspect of the invention, there is provided a method, comprising comparing a datagram length of a received datagram of a user datagram protocol with a first packet data unit length of a first packet data unit; decapsulating, if the datagram length and the first packet data unit length do not match, a second packet data unit from the datagram, wherein the first packet data unit is encapsulated in the datagram; the first packet data unit includes a first header of a tunneling protocol and a first user data packet; the first header indicates the first packet data unit length of the first packet data unit; the second packet data unit includes a second header of the tunneling protocol and a second user data packet, the second header indicates a second packet data unit length of the second packet data unit, and the second packet data unit is different from the first packet data unit.

Further packet data units may be decapsulated from the datagram until all packet data units encapsulated in the datagram are decapsulated, wherein each of the further packet data units may include a respective further header of the tunneling protocol and a respective further user data packet, each of the further headers may indicate a packet data unit length of the respective further packet data unit; and each of the further packet data units may be different from the first packet data unit.

The method according to each of the eighth and ninth aspects may further comprise indicating that an apparatus performing the method is adapted to decapsulate the plural packet data units from the datagram.

The method according to each of the eighth and ninth aspects may further comprise monitoring if a user plane bearer for bearing the datagram is being set up; wherein it may be indicated, if the user plane bearer is being set up, in a control message related to the setting up of the user plane bearer, that the apparatus is adapted to decapsulate the plural packet data units from the datagram. The control message may be at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

Each of the methods according to the seventh to ninth aspects may be a method for sending packet data units.

According to a tenth aspect of the invention, there is provided a computer program product comprising a set of instructions which, when executed on an apparatus, is configured to cause the apparatus to carry out the method according to at least one of the seventh to ninth aspects. The computer program product may be embodied as a computer-readable medium or directly loadable into a computer.

According to some example embodiments of the invention, at least one of the following technical effects is provided:
the ratio of payload/overhead is improved (i.e. increased);
efficiency of transmission is improved;
packet rate in the network is improved, i.e. reduced;
the solution is backwards compatible;
no need for implementation of solution in the whole network at once;
impact on network configuration management may be minimized or eliminated altogether.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the example embodiments of the present invention which is to be taken in conjunction with the appended drawings, wherein FIG. 1 shows an apparatus according to an example embodiment of the invention;

FIG. 2 shows a method according to an example embodiment of the invention;

FIG. 3 shows an apparatus according to an example embodiment of the invention;

FIG. 4 shows a method according to an example embodiment of the invention;

FIG. 5 shows an apparatus according to an example embodiment of the invention;

FIG. 6 shows a method according to an example embodiment of the invention; and

FIG. 7 shows an apparatus according to an example embodiment of the invention.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

According to some example embodiments of the invention, multiple G-PDUs are sent in a single UDP datagram. Such a encapsulation of plural G-PDUs in one UDP datagram is not foreseen in nowadays standards.

Three options for encapsulating plural G-PDUs in a single UDP datagram on the sender's side and decapsulating them on the receiver's side are provided.

1. Using the spare bit in GTP-U header octet 1. If the sender puts more than one G-PDUs into a single UDP datagram, then the sender shall set the bit of at least the first of these G-PDUs to '1'. For example, the sender may set the bit in all of these G-PDUs, but the last one to '1'.
2. Specifying a particular extension header type for the next G-PDU. For example, this extension header may be transmitted every time if another G-PDU follows this G-PDU (i.e., the G-PDU with the particular extension header) in the UDP datagram.
3. Sending more than one G-PDUs with a single UDP datagram without modifying GTP-U. The receiver compares the sizes (lengths) of the UDP datagram and the first encapsulated G-PDU and determines from that comparison if further G-PDU(s) are encapsulated in the UDP datagram.

In options 1 and 2, the sender informs the receiver explicitly on the presence of plural G-PDUs in the UDP datagram, which may not be the case according to option 3.

Two or three of the options may be combined in a single implementation. For example, a receiver may check if the first G-PDU informs on the presence of plural G-PDUs according to one (or both) of options 1 and 2, and may additionally compare the lengths of the UDP datagram with that of the first G-PDU. The length of each G-PDU is indicated in the header thereof (e.g. in octets 3 and 4, see Table 1 below). Only if all performed checks imply that plural G-PDUs are encapsulated in the UDP datagram, the receiver assumes the same and attempts to decapsulate plural G-PDUs. Otherwise, it is assumed that the UDP datagram is corrupted and the receiver discards the datagram. Alternatively, the receiver may assume that plural G-PDUs are encapsulated if at lest one of the checks implies that plural G-PDUs are encapsulated, and attempt to decapsulate them.

Decapsulating a G-PDU may include decoding the bits belonging to the G-PDU according to the length indication in the header of the G-PDU.

In some example embodiments of the invention according to option 1 and/or option 2, the information on the encapsulation of plural G-PDUs is included in all encapsulated G-PDUs except for the last G-PDU encapsulated in the UDP datagram. Thus, the receiver may recognize from the absence of the information that the last G-PDU is decapsulated.

In some example embodiments of the invention according to option 1 and/or option 2, the information on the encapsulation of plural G-PDUs is included in the first encapsulated G-PDU only. Then, the receiver may try to decapsulate a further G-PDU each time after having decapsulated a prior G-PDU. If decapsulation of the further G-PDU fails, the receiver assumes that all encapsulated G-PDUs are decapsulated. As an alternative thereto, according to some example embodiments of the invention, the receiver may compare the length indicated in the G-PDU to be decapsulated next with the remaining bits to decode, and may decide, based on this comparison, if a further G-PDU is to be decapsulated, similar to option 3.

In some example embodiments of the invention, plural G-PDUs are included in a single UDP datagram only if the lengths of the G-PDUs are sufficiently small. E.g., if one of the G-PDUs is larger than a certain limit, it will not be included in the UDP datagram but will be sent in a separate UDP datagram comprising only this G-PDU. The other G-PDUs may still be included in the single UDP datagram, or each of them or some of them may be sent in separate UDP datagrams.

Example embodiments of the invention may be applied to G-PDUs carrying VoLTE traffic. Another example, where the overhead becomes larger than the payload and where it may be useful to apply example embodiments of the invention is a TCP acknowledgement. However, the invention is not limited to these examples but may be applied to any G-PDUs transported in UDP datagrams.

In the case of multiplexing plural VoLTE G-PDUs into a single UDP datagram, the G-PDUs may originate from the same user of from different users and/or may they may be directed to the same receiver or to different receivers (on GTP level). The sender may buffer G-PDUs for some time before encapsulating them into a UDP datagram. The time should be chosen such that QoS of VoLTE (jitter and latency) is not severely negatively affected. Therefore, the most appealing use case is when the G-PDUs originate from different users and directed to the same receiver (i.e. gateway, on GTP level), because in this case almost no additional jitter and latency are introduced.

In addition, some example embodiments of the invention provide a way to support the network operator in the upgrade scenario when one or more of the above options are introduced into the network. Namely, in the long run, an operator, who decides to deploy one or more of the options, should preferably upgrade all GTP entities to support the option(s). This, however, will take some time and, therefore, the PLMN will have GTP entities that support the option(s) and GTP entities that do not. For this transitional period of time, the operator may employ one of the example embodiments of the invention, according to which an upgraded GTP entity informs a GTP peer that it provides the capability of decapsulating plural G-PDUs from a single UDP datagram. According to some example embodiments of the invention, the information may additionally imply that the upgraded GTP entity provides the capability of encapsulating plural G-PDUs into a single UDP datagram.

In some of these example embodiments, corresponding information as regards the capability is added to the control plane signalling, which is used for the user plane bearer setup procedures. Alternatively, the capability information may be provided e.g. in a message dedicated to providing the capability information. For example, across S2, S3, S4, S5/S8 and S16 interfaces GTPv2 is used in control plane and GTPv1-U is used in user plane. For these interfaces, GTPv2 feature, the Node Features information element (IE) may be used for communicating user plane capability to the GTP peer. This alternative however has the following shortcoming for S11/S1-U and S4-C/S12 interfaces. Across these interfaces GTP-U endpoints (eNB/RAC and SGW) do not have a direct control plane interface. Rather, MME/S4-SGSN acts as a control plane agent between eNB/RAC and SGW. Therefore, MME/S4-SGSN may need to keep in its internal database the capability of the GTP-U endpoints.

Alternatively or in addition, the operator may store in the GTP entities capability information of respective GTP peers as regards decapsulation of multiple G-PDUs from a single UDP datagram. This capability information may be provided and maintained by O&M.

Options 1 to 3 may be related to the user plane, while the upgrade scenario may be related to the control plane.

FIG. 1 shows an apparatus according to an example embodiment of the invention. The apparatus may be GTP entity, such as a sender, or an element thereof. FIG. 2 shows a method according to an example embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises encapsulating means 10. The encapsulating means 10 may be an encapsulating circuit.

The encapsulating means 10 encapsulates plural packet data units (e.g. G-PDUs) into a datagram of a user datagram protocol, such as UDP (S10). Each of the plural packet data units comprises a respective header of a tunneling protocol (e.g. GTP) and a respective user data packet. Each of the headers indicates a length of the respective packet data unit.

FIG. 3 shows an apparatus according to an example embodiment of the invention. The apparatus may be GTP entity, such as a receiver, or an element thereof. FIG. 4 shows a method according to an example embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises monitoring means 110 and decapsulating means 120. The monitoring means 110 and the decapsulating means 120 may be a monitoring circuit and a decapsulating circuit, respectively.

The monitoring means 110 monitors if a first header comprises an information that plural packet data units (e.g. G-PDUs) are encapsulated in the datagram (S110). The first header is comprised in a received datagram of a user datagram protocol such as UDP. Each of the plural packet data units comprises a respective header of a tunneling protocol (e.g. GTP) and a respective user data packet, and each of the headers indicates a length of the respective user data packet. A first packet data unit of the plural packet data units is arranged first in the datagram and comprises the first header as the respective header. That is, the first packet data unit comprises the first header and a first user data packet.

If the first header comprises the information that plural packet data units are encapsulated in the datagram (S110="yes"), the decapsulating means 120 decapsulates the plural packet data units from the datagram (S120).

FIG. 5 shows an apparatus according to an example embodiment of the invention. The apparatus may be GTP entity, such as a receiver, or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises comparing means 150 and decapsulating means 160. The comparing means 150 and the decapsulating means 160 may be a comparing circuit and a decapsulating circuit, respectively.

The comparing means 150 compares a datagram length of a received datagram of a user datagram protocol (e.g. UDP) with a first packet data unit length of a first packet data unit such as a G-PDU (S150). The first packet data unit is encapsulated in the datagram. The first packet data unit comprises a first header of a tunneling protocol (e.g. GTP) and a first user data packet. The first header indicates the first packet data unit length of the first packet data unit. The first packet data unit length indicated in the first header may be the length of the first packet data unit, or it may be a length fro which the length of the first packet data unit may be derived.

If the datagram length and the first packet data unit length do not match (S150="no"), the decapsulating means 160 decapsulates a second packet data unit from the datagram (S160). The second packet data unit comprises a second header of the tunneling protocol and a second user data packet, and the second header indicates a second packet data unit length of the second packet data unit. The second packet data unit is different from the first packet data unit.

Depending on implementation, the datagram length matches the first packet data unit length if the lengths are the same, or if some lengths which may be unambiguously derived from the length of the datagram and the indicated length of the first packet data unit are the same. These lengths are determined such that one may decide based on these lengths whether of not the datagram has a sufficient size to comprise more packet data units than the first packet data unit.

FIG. 7 shows an apparatus according to an example embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 2, 4, and 6 and related description.

Hereinafter, implementations of options 1 to 3 according to example embodiments of the invention and of example embodiments supporting the upgrade scenario are described in detail. However, these detailed descriptions are not limiting. For example, specific values and procedures indicated hereinafter are provided as examples only and in some example embodiments of the invention, they may be different from those disclosed hereinafter.

In the following detailed description, reference is made to 3GPP standard documents and tables comprised therein. For the meaning of the fields other than the indication of plural encapsulated G-PDUs in a UDP datagram and the indication of the capability to decapsulate plural G-PDUs encapsulated in a single UDP datagram, and for the content of the notes related to the other fields, it is referred to the respective 3GPP standard document.

Option 1: Using the Spare Bit in GTP-U Header, Octet 1

According to present standards, bit 4 in the first octet of the GTP-U header is a spare bit (see FIGS. 5.1-1 of 3GPP TS 29.281). According to the standard, sender shall set it to '0' and the receiver shall ignore it.

TABLE 1

GTP-U Header according to 3GPP TS 29.281, FIG. 5.1-1

| Octets | Bits | | | | | | | |
|---|---|---|---|---|---|---|---|---|
| | 8 | 7 | 6 | 5 | 4 | 3 | 2 | 1 |
| 1 | Version | | PT | (*) | E | S | P | N |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)[1) 4)] | | | | | | | |
| 10 | Sequence Number (2nd Octet)[1) 4)] | | | | | | | |
| 11 | N-PDU Number[2) 4)] | | | | | | | |
| 12 | Next Extension Header Type[3) 4)] | | | | | | | |

NOTE 0:
(*) This bit is a spare bit. It shall be sent as '0'. The receiver shall not evaluate this bit.

According to some example embodiments of the invention, the present spare bit is made useful. If set to '1', this indicates that another G-PDU follows. Therefore, according to some example embodiments of the invention, 3GPP TS 29.281, subclause 5.1 "General format" is changed as shown in Table 2:

TABLE 2

GTP-U Header according to option 1 of the invention, based on 3GPP TS 29.281, FIG. 5.1-1

| Octets | Bits | | | | | | | |
|---|---|---|---|---|---|---|---|---|
| | 8 | 7 | 6 | 5 | 4 | 3 | 2 | 1 |
| 1 | Version | | PT | NG | E | S | P | N |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)[1) 4)] | | | | | | | |
| 10 | Sequence Number (2nd Octet)[1) 4)] | | | | | | | |
| 11 | N-PDU Number[2) 4)] | | | | | | | |
| 12 | Next Extension Header Type[3) 4)] | | | | | | | |

Instead of the spare bit, the GTP-U header comprises a field called "Next G-PDU (NG)", for example. This flag indicates the presence or absence of another G-PDU in the UDP datagram. If the sender puts more than one G-PDU into a single UDP datagram, then the sender sets the flag to '1'. If another G-PDU does not follow, then the flag is set to '0'. Since the field is in the first octet, it is always present. Note that octets 3 and 4 give an indication of the length of the G-PDU.

Option 1 may be used for all GTP-U interfaces. Note that Table 2 shows a case where all G-PDUs except for the last G-PDU of the UDP datagram comprise the indication NG=1. In some example embodiments, only the first G-PDU encapsulated in the UDP datagram comprises the indication NG=1.

Option 2: Extension Header Type to Indicate Plural G-PDUs in One UDP Datagram

Compared to today's 3GPP TS 29.281, subclause 5.2, a new extension header type, e.g. "GTP-U Extension Header" is defined.

TABLE 3

Definition of Extension Header Types according to option 2, based on 3GPP TS 29.281, FIG. 5.2.1-3

| Next Extension Header Field Value | Type of Extension Header |
|---|---|
| 0000 0000 | No more extension headers |
| 0000 0001 | Reserved - Control Plane only. |
| 0000 0010 | Reserved - Control Plane only. |
| 0010 0000 | Service Class Indicator |
| 0100 0000 | UDP Port. Provides the UDP Source Port of the triggering message. |
| 1100 0000 | PDCP PDU Number [4]-[5]. |
| 1100 0001 | Reserved - Control Plane only. |
| 1100 0010 | Reserved - Control Plane only. |
| 1110 0000 | Another G-PDU follows this G-PDU in the UDP datagram. |

According to Table 3, it has a value of 11100000. However, according to some example embodiments of the invention, it may have any value which is not used for another header type.

In some example embodiments, bits 7 and 8 have the value 11 (as in Table 3) because these bits determine the behavior of the receiver if it does not know the extension header type, as shown in Table 4:

TABLE 4

Definition of bits 7 and 8 of Extension Header Types based on 3GPP TS 29.281, FIG. 5.2.1-2

| Bits | | Meaning |
|---|---|---|
| 8 | 7 | |
| 0 | 0 | Comprehension of this extension header is not required. An Intermediate Node shall forward it to any Receiver Endpoint |
| 0 | 1 | Comprehension of this extension header is not required. An Intermediate Node shall discard the Extension Header Content and not forward it to any Receiver Endpoint. Other extension headers shall be treated independently of this extension header. |
| 1 | 0 | Comprehension of this extension header is required by the Endpoint Receiver but not by an Intermediate Node. An Intermediate Node shall forward the whole field to the Endpoint Receiver. |
| 1 | 1 | Comprehension of this header type is required by recipient (either Endpoint Receiver or Intermediate Node) |

If bits 7 and 8 are set to 11, (e.g. as in 1110 0000) it is ensured that the receiver either supports the feature of multiple G-PDUs in a single UDP datagram (and therefore is capable of decoding the multiplexed data), or the receiver will inform the sender that it does not support the feature by sending back the Supported Extension Headers Notification message. This alternative may complement the upgrade scenario related to the control plane solution.

According to some example embodiments of the invention, the extension header is transmitted if another G-PDU follows the G-PDU comprising this extension header in the UDP datagram. The extension header is 4 octets long, and therefore the Length field has value 1 (the length field indicates the length in units of 4 octets).

TABLE 5

Another G-PDU Extension Header according to some example embodiments of the invention

| Octets | Bits | | | | | | | |
|---|---|---|---|---|---|---|---|---|
| | 8 | 7 | 6 | 5 | 4 | 3 | 2 | 1 |
| 1 | 0x01 | | | | | | | |
| 2-3 | e.g. 0xE0 (another G-PDU follows this G-PDU in the UDP datagram) | | | | | | | |
| 4 | Next Extension Header Type (note) | | | | | | | |

NOTE:
The value of this field is 0 if no other Extension header follows.

Option 2 may be used for all GTP-U interfaces. Note that a case is described where all G-PDUs except for the last G-PDU of the UDP datagram comprise the extension header which indicates that another G-PDU follows in the UDP datagram. In some example embodiments, only the first G-PDU encapsulated in the UDP datagram comprises this extension header.

According to options 1 and 2, if the receiver recognizes that at least one header (the header of the first G-PDU) indicates the presence of plural G-PDUs, it attempts to decode the plural G-PDUs.

Option 3: Sending More than One G-PDUs with a Single UDP Datagram without Explicitly Informing the Receiver GTP-U entity sends more than one G-PDUs with a single UDP datagram but does not indicate the presence of plural G-PDUs in a header of the G-PDUs. Thus, the receiver does not receive an explicit indication on plural encapsulated G-PDUs in the UDP datagram.

The receiving GTP-U entity reads G-PDU from UDP socket. If UDP datagram length is greater than the length of the G-PDU available to carry G-PDUs, this indicates more than one G-PDUs are included the UDP datagram. In such case, the receiving GTP-U entity continues decoding subsequent G-PDUs.

Note that, for comparing the lengths of UDP datagram, some fixed parts such as a header of the UDP datagram may have to be taken into account because the header is not available for carrying G-PDUs. Also, according to 3GPP TS 29.281, section 5.1, the length indicated in the header of the G-PDU does not include the bits of the mandatory parts of the header. For a comparison of the lengths, the length of the mandatory parts has to be added to the length indicated in the header. That is, the receiver determines if the length of the part of the UDP datagram available for G-PDU(s) and the length indicated in the (first) G-PDU header match, wherein "matching" includes that the "raw lengths" (i.e. the total length of the UDP datagram and the length indicated in the header of the G-PDU) may be appropriately adapted before they are compared. If the (adapted) lengths do not match (i.e., if the length available for G-PDUs is larger than a length calculated based on the length indicated in the G-PDU header), it is assumed that the UDP datagram encapsulates plural G-PDUs.

It is possible that the mismatch between UDP datagram length and G-PDU length was caused by IP packet being corrupted. Such case however can be easily detected, if the received fails to extract multiple G-PDUs from the UDP datagram. In some example embodiments of the invention, a corrupted IP packet is handled such that it is simply discarded.

Option 3 may be used for all GTP-U interfaces.

Support of Upgrade Scenario Via Control Plane

During the feature upgrade period, PLMNs will have GTP entities that support the feature of encapsulating multiple G-PDUs into a single UDP datagram and GTP entities that do not. Thus, a GTP entity that does not support this feature may receive a UDP datagram comprising plural G-PDUs, but the GTP entity is not configured to decapsulate the plural G-PDUs. In order to solve this problem, according to some example embodiments of the invention, a new information element is added to the control plane procedures that are used for the user plane bearer setup. The new IE in a CP message indicates the feature support to the user plane peer.

During user plane bearer setup, with both GTP-C protocol flavors GTPv1 and GTPv2, GTP control plane entity sends to its peer user plane F-TEID-U (i.e., IP address and TEID-U). If direct tunnel, S12 or S1-U is in use in user plane, then the SGSN/MME acts as a control plane agent (Gn-C/Gp-C, S4-C and S11) and sends RNC/eNB's F-TEID-U to GGSN/SGW. SGSN/MME also sends GGSN/SGW's F-TEID-U to RNC/eNB. In all other cases, GTP entity sends to its peer own user plane F-TEID-U via control plane signalling.

According to some example embodiments of the invention, a new IE or a new flag in one of the existing IEs is sent along with F-TEID-U and indicates to the peer that the sender of the new IE and the new flag, respectively, supports multiple G-PDUs in a single UDP datagram. In some example embodiments of the invention, the GTP entity provides the new IE and the new flag, respectively, if it is configured to decapsulate plural G-PDUs from a single UDP datagram, regardless of whether it is also configured to encapsulate plural G-PDUs into a single UDP datagram. In some example embodiments of the invention, the new IE and the new flag, respectively is provided only if the GTP entity is configured to both encapsulate plural G-PDUs into a single UDP datagram and decapsulate plural G-PDUs from a single UDP datagram.

Such an indication informs about the node capability at the given moment in time. According to current 3GPP standards, a node capability can be communicated only with GTPv2 and only between direct GTPv2 peers (MME/S4-SGSN and SGW, SGW and PGW, ePDG/TWAG and PGW), as specified in 3GPP TS 29.274 (see the definition of "Node Features" in subclauses 7.1.1, 7.1.2 and 8.83).

Changes to GTPv2 Spec

For GTPv2 based control plane interfaces, a new flag may be added, e.g. "Multiple G-PDU support Indication" (MGSI) to the existing Indication information element (IE). Indication Flags IE is already delivered with Create Session Response, Create Session Request, Modify Bearer Request and Modify Bearer Response messages when a user plane bearer is being setup for the given PDN connection. So, GTP-U entities will be informed about the peer capability before they start sending and receiving G-PDUs.

GTPv2 proposal is illustrated on the below quote from TS 29.274:

TABLE 6

Indication of Multiple G-PDU support, based on 3GPP TS 29.274, FIG. 8.12-1

| Octets | Bits | | | | | | | |
|---|---|---|---|---|---|---|---|---|
| | 8 | 7 | 6 | 5 | 4 | 3 | 2 | 1 |
| 1 | Type = 77 (decimal) | | | | | | | |
| 2 to 3 | Length = n | | | | | | | |
| 4 | Spare | | | | Instance | | | |
| 5 | DAF | DTF | HI | DFI | OI | ISRSI | ISRAI | SGWCI |
| 6 | SQCI | UIMSI | CFSI | CRSI | P | PT | SI | MSV |
| 7 | RetLoc | PBIC | SRNI | S6AF | S4AF | MBMDT | ISRAU | CCRSI |
| 8 | CPRAI | ARRL | PPOF | PPON/ PPEI | PPSI | CSFBI | CLII | CPSR |
| 9 | Spare | Spare | Spare | ~~Spare~~ MGSI | PSCI | PCRI | AOSI | AOPI |
| 10 to (n + 4) | These octet(s) is/are present only if explicitly specified | | | | | | | |

However, e.g. eNB and SGW cannot use GTPv2 to communicate across S1-U interface (they cannot use GTPv1-C either) and therefore eNB and SGW cannot use GTPv2 "Node Features" for negotiating the feature support. The same limitation applies to RNC and SGW when S12 interface is used. According to some example embodiments of the invention, eNB/RNC and SGW exchange GTPv2 "Node Features" via MME/S4-SGSN. In these cases, MME/SGSN may remember eNB/RNC and SGW capabilities.

According to some example embodiments of the invention, the feature support indication is sent at each PDN connection setup with CP messages. Thus, the solution is made generic, i.e. applicable to S1-U and S12 interfaces. Then, the indication will be redundant sometimes, because e.g. if eNB and SGW have already indicated the feature support to each other, there is no need to repeat this with every PDN setup. On the other hand, redundancy will ensure that a change in capability is detected dynamically. For instance, if eNB is upgraded to support the feature, MME will inform all concerned SGWs about this upgrade with regular signaling.

Hereinafter, it is outlined how current 3GPP specifications may be adapted in order to standardize some example embodiments of the invention. However, example embodiments of the invention may employ the same functionality even if the 3GPP standards are not adapted correspondingly. Note that the values etc. given in the below description are examples only and are not intended to limit the scope of the invention which is defined by the claims.

As shown in Table 6, Octet 9, bit 5 comprises MGSI (Multiple G-PDU Support Indication): If this bit is set to 1, it indicates that the sender supports decapsulating multiple G-PDUs from a single UDP datagram. For example, it can indicate that an user plane node supports receiving multiple G-PDUs in a single UDP datagram. In some example embodiments, the indication may additionally imply that the user plane supports sending multiple G-PDUs in a single UDP datagram. Instead of Octet 9, bit 5, MGSI may be provided in place of one of the other spare bits according to current standards.

Changes to GTPv1 Spec

For GTPv1 based control plane interfaces, according to some example embodiments of the invention, a new flag, e.g. "Multiple G-PDU support Indication", is added to the existing Extended Common Flags IE. Currently, Extended Common Flags IE may be sent only with Create PDP Context Request and Update PDP Context Request messages when a user plane bearer is being setup for the given PDN connection. According to some example embodiments of the invention, the Extended Common Flags IE with "Multiple G-PDU support Indication" bit set is also added to Create PDP Context Response and/or Update PDP Context Response. So, both GTP-U entities are informed about the peer capability before they start sending and receiving G-PDUs.

In Table 7, GTPv1-C proposal is illustrated based on TS 29.060:

TABLE 7

Common Flags Information Element according to some example embodiments of the invention, based on 3GPP TS 29.060, FIG. 7.7.93.1

| Octets | Bits | | | | | | | |
|---|---|---|---|---|---|---|---|---|
| | 8 | 7 | 6 | 5 | 4 | 3 | 2 | 1 |
| 1 | Type = 193 (Decimal) | | | | | | | |
| 2-3 | Length | | | | | | | |
| 4-n | Spare | Spare MGSI | PCRI | VB | RetLoc | CPSR | CCRSI | Unauthenticated IMSI |

The MGSI (Multiple G-PDU Support Indication) bit field in octet 4, bit 7, communicates to GTP-U entity if the sender of the IE supports decapsulation of multiple G-PDUs from a single UDP datagram or not. If this bit is set to 1, it indicates that the sender supports sending and receiving multiple G-PDUs with a single UDP datagram. Instead of octet 4, bit 7, MGSI may be provided in place of one of the other spare bits according to current standards.

Changes to S1AP Spec

For S1-MME interface, according to some example embodiments of the invention, a new ASN.1 type and respective parameter to S1AP spec (3GPP TS 36.413) may be added.

S1AP proposal is illustrated in Table 8, based on 3GPP TS 36.413.

TABLE 8

E-RAB Setup Request according to some example embodiments of the invention, based on 3GPP TS 36.413

```
-- ***************************************************************
--
-- E-RAB Setup Request
--
-- ***************************************************************
E-RABToBeSetupItemBearerSUReq ::= SEQUENCE {
    e-RAB-ID                    E-RAB-ID,
    e-RABlevelQoSParameters     E-RABLevelQoSParameters,
    transportLayerAddress       TransportLayerAddress,
    gTP-TEID                    GTP-TEID,
    nAS-PDU                     NAS-PDU,
    iE-Extensions               ProtocolExtensionContainer { {E-
RABToBeSetupItemBearerSUReqExtIEs} } OPTIONAL,
    ...,
    sGWmultipleGpduSupportIndicationMultipleGpduSupportIndication OPTIONAL
{
```

MME sends E-RAB Setup Request message to eNB with new parameter sGWmultipleGpduSupportIndication, which informs eNB if the SGW supports the feature or not. The E-RAB Setup Response message may be correspondingly adapted, as shown in Table 9. That is, eBN sends E-RAB Setup Response message to MME with new parameter eNBmultipleGpduSupportIndication, which informs MME whether or not the eNB supports the feature of decapsulating multiple G-PDUs from a single UDP datagram:

TABLE 9

E-RAB Setup Response according to some example embodiments of the invention, based on 3GPP TS 36.413

```
-- ***************************************************************
--
-- E-RAB Setup Response
--
-- ***************************************************************
```

TABLE 9-continued

E-RAB Setup Response according to some example embodiments
of the invention, based on 3GPP TS 36.413

```
E-RABSetupItemBearerSURes ::= SEQUENCE {
    e-RAB-ID                    E-RAB-ID,
    transportLayerAddress       TransportLayerAddress,
    gTP-TEID                    GTP-TEID,
    iE-Extensions               ProtocolExtensionContainer { {E-
RABSetupItemBearerSUResExtIEs} } OPTIONAL,
    ...,
    eNBmultipleGpduSupportIndicationMultipleGpduSupportIndication OPTIONAL
}
```

The corresponding ASN.1 type definition according to some example embodiments of the invention is as shown in Table 10:

TABLE 10

ASN.1 Type defintion

```
MultipleGpduSupportIndication ::= ::= ENUMERATED{
    multipleGpduNotSupported,
    multipleGpduSupported,
    ...
}
```

Similar changes may apply to E-RAB MODIFY REQUEST/RESPONSE messages.

Changes to Ranap Spec

According to some example embodiments of the invention, for Iu interface, a new ASN.1 type and respective parameter are added to RANAP spec (3GPP TS 25.413).

RANAP proposal is illustrated in Table 11, based on 3GPP TS 25.413.

TABLE 11

RANAP Assignment Request according to some example embodiments
of the invention, based on 3GPP TS 25.413

```
-- **************************************************************
--
-- RAB Assignment Request
--
-- **************************************************************
TransportLayerInformation ::= SEQUENCE {
    transportLayerAddress         TransportLayerAddress,
    iuTransportAssociation        IuTransportAssociation,
    iE-Extensions                 ProtocolExtensionContainer {
{TransportLayerInformation-ExtIEs}}    OPTIONAL,
    ...,
    gGSNmultipleGpduSupportIndication   MultipleGpduSupportIndication OPTIONAL
}
```

As shown in Table 11, SGSN sends RAB Assignment Request message to RNC with new parameter gGSNmultipleGpduSupportIndication, which informs RNC whether or not the GGSN supports the feature of decapsulating multiple G-PDUs from a single UDP datagram. Correspondingly, as shown in Table 12, RNC sends RAB Assignment Response message to SGSN with new parameter rncMultipleGpduSupportIndication, which informs SGSN whether or not the RNC supports the feature of decapsulating multiple G-PDUs from a single UDP datagram. The ASN.1 type definition for these parameters may be the same as shown in Table 10.

TABLE 12

RANAP Assignment Response according to some example embodiments
of the invention, based on 3GPP TS 25.413

```
-- ***************************************************************
--
-- RAB Assignment Response
--
-- ***************************************************************
RAB-SetupOrModifiedItem ::= SEQUENCE {
    rAB-ID                          RAB-ID,
    transportLayerAddress           TransportLayerAddressOPTIONAL,
    iuTransportAssociation          IuTransportAssociation OPTIONAL,
    dl-dataVolumes                  DataVolumeList   OPTIONAL,
    iE-Extensions                   ProtocolExtensionContainer { {RAB-
SetupOrModifiedItem-ExtIEs} }                OPTIONAL,
    ...,
    rncMultipleGpduSupportIndication   MultipleGpduSupportIndication OPTIONAL
}
```

Similar changes may apply to RAB MODIFY REQUEST message.

Some example embodiments of the invention may be employed in a 3GPP network. They may be employed also in other 3GPP and non-3GPP mobile networks such as CDMA, EDGE, LTE, LTE-A, UTRAN, WiFi, WLAN networks, etc., if a GTP interface is implemented, or if the same multiplexing technique is used for any other protocols.

Example embodiments of the invention may be applied to any network entity employing a GTP-U interface. Non-limiting examples are PGW and TWAG (within TWAN), connected via S2a interface;
PGW and ePDG connected via S2b interface;
SGW and eNB connected via S1-U interface;
SGW and SSGN connected via S4 interface; and
PGW and SGW connected via S5/S8 interface.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a GTP peer such as a MME, eNB, PGW, TWAG, ePDG, SGW, SSGN, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. Apparatus, comprising
at least one memory comprising computer program code; and
at least one processor, the at least one memory and the computer program code configured, with the at least one processor, to cause the apparatus to perform operations comprising:
encapsulate plural packet data units into a datagram of a user datagram protocol, wherein:
 each of the plural packet data units comprises a respective header of a tunneling protocol and a respective user data packet, and each of the headers indicates a length of the respective packet data unit;
 the plural packet data units include a first packet data unit and are arranged in the datagram in an order starting with the first packet data unit; and
 the plural packet data units include a last packet data unit and are arranged in the datagram in an order ending with the last packet data unit; and
inform, by at least the header of the first packet data, that the encapsulating encapsulates the plural packet data units into the datagram in the headers of all of the plural packet data units except for the last packet data unit.

2. The apparatus according to claim 1, wherein
the informing informs that the encapsulating encapsulates the plural packet data units into the datagram by setting a predefined bit in the header of the first packet data unit.

3. The apparatus according to claim 1, wherein
the informing informs that the encapsulating encapsulates the plural packet data units into the datagram by extending the header of the first packet data unit with a predefined extension header.

4. The apparatus according to claim 1, wherein the at least one memory and the computer program code are further configured, with the at least one processor, to cause the apparatus to perform operations comprising compare the respective length of each of the plural packet data units with a length threshold;
inhibit the encapsulating from encapsulating the plural packet data units into the datagram in response to at least one of the lengths exceeding the length threshold.

5. The apparatus according to claim 1, the at least one memory and the computer program code are further configured, with the at least one processor, to cause the apparatus to perform operations comprising
check whether an indication is stored that an intended receiver of the datagram is adapted to decapsulate the plural packet data units out of the datagram;
prohibit, in response to the indication not being stored, that the encapsulating encapsulates the plural packet data units into the datagram.

6. The apparatus according to claim 5, wherein the at least one memory and the computer program code are further configured, with the at least one processor, to cause the apparatus to perform operations comprising receive the indication in a control message related to setting up a bearer for bearing the datagram, wherein
the control message is at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

7. Apparatus, comprising
at least one memory comprising computer program code; and
at least one processor, the at least one memory and the computer program code configured, with the at least one processor, to cause the apparatus to perform operations comprising:
monitor whether a first header included in a received datagram of a user datagram protocol includes an information that plural packet data units are encapsulated in the datagram;
decapsulate, in response to the first header including the information, the plural packet data units from the datagram, wherein
each of the plural packet data units includes a respective header of a tunneling protocol and a respective user data packet,
each of the headers indicates a length of the respective user data packet,
a first packet data unit of the plural packet data units is arranged first in the datagram and includes the first header as the respective header; and
the plural packet data units are decapsulated in a sequence according to an arrangement of the packet data units in the datagram;
detect whether the packet data unit decapsulated last by the decapsulating includes the information; and
stop the decapsulating by the decapsulating in response to the packet data unit decapsulated last not including the information.

8. The apparatus according to claim 7, wherein
the monitoring monitors that the first header includes the information in response to a predefined bit being set in the first header.

9. The apparatus according to claim 7, wherein
the monitoring monitors that the first header includes the information in response to the first header being extended by a predefined extension header.

10. Apparatus, comprising
at least one memory comprising computer program code; and
at least one processor, the at least one memory and the computer program code configured, with the at least one processor, to cause the apparatus to perform operations comprising:
compare a datagram length of a received datagram of a user datagram protocol with a first packet data unit length of a first packet data unit;
decapsulate, in response to the datagram length and the first packet data unit length not matching, a second packet data unit from the datagram, wherein
the first packet data unit is encapsulated in the datagram;
the first packet data unit includes a first header of a tunneling protocol and a first user data packet;
the first header indicates the first packet data unit length of the first packet data unit;
the second packet data unit includes a second header of the tunneling protocol and a second user data packet,
the second header indicates a second packet data unit length of the second packet data unit, and
the second packet data unit is different front the first packet data unit.

11. The apparatus according to claim 7, wherein the at least one memory and the computer program code are further configured, with the at least one processor, to cause the apparatus to perform operations comprising
indicate that the apparatus supports the decapsulating.

12. The apparatus according to claim 11, wherein the at least one memory and the computer program code are further configured, with the at least one processor, to cause the apparatus to perform operations comprising
monitor whether a user plane bearer for bearing the datagram is being set up;
indicate, in response to the user plane bearer being set up, in a control message related to the setting up of the user plane bearer, that the apparatus supports the decapsulating.

13. The apparatus according to claim 12, wherein
the control message is at least one of the following: a create bearer request, a modify bearer request, a create bearer response, a modify bearer response, a create context request, an update context request, a create context response, an update context response, a radio access bearer setup request, a radio access bearer setup response, a radio access bearer assignment request, and a radio access bearer assignment response.

14. An apparatus, comprising
at least one memory comprising computer program code; and
at least one processor, the at least one memory and the computer program code configured, with the at least one processor, to cause the apparatus to perform operations comprising:
compare a datagram length of a received datagram of a user datagram protocol with a first packet data unit length of a first packet data unit;
decapsulate, in response to the datagram length and the first packet data unit length not matching, a second packet data unit from the datagram, wherein
the first packet data unit is encapsulated in the datagram;
the first packet data unit includes a first header of a tunneling protocol and a first user data packet;

the first header indicates the first packet data unit length of the first packet data unit;

the second packet data unit includes a second header of the tunneling protocol and a second user data packet, the second header indicates a second packet data unit length of the second packet data unit, and the second packet data unit is different from the first packet data unit; and decapsulate further packet data units from the datagram until all packet data units encapsulated in the datagram are decapsulated, wherein:

each of the further packet data units includes a respective further header of the tunneling protocol and a respective further user data packet, each of the further headers indicates a packet data unit length of the respective further packet data unit; and each of the further packet data units is different from the first packet data unit.

15. An apparatus, comprising at least one memory comprising computer program code; and at least one processor, the at least one memory and the computer program code configured, with the at least one processor, to cause the apparatus to perform operations comprising:

encapsulate plural packet data units into a datagram of a user datagram protocol, wherein each of the plural packet data units comprises a respective header of a tunneling protocol and a respective user data packet, and each of the headers indicates a length of the respective packet data unit, wherein the plural packet data units include a first packet data unit and are arranged in the datagram in an order starting with the first packet data unit;

inform, by at least the header of the first packet data, that the encapsulating encapsulates the plural packet data units into the datagram;

compare the respective length of each of the plural packet data units with a length threshold; and inhibit the encapsulating from encapsulating the plural packet data units into the datagram in response to at least one of the lengths exceeding the length threshold.

16. An apparatus, comprising at least one memory comprising computer program code; and at least one processor, the at least one memory and the computer program code configured, with the at least one processor, to cause the apparatus to perform operations comprising:

monitor whether a first header included in a received datagram of a user datagram protocol includes an information that plural packet data units are encapsulated in the datagram;

decapsulate, in response to the first header including the information, the plural packet data units from the datagram, wherein each of the plural packet data units includes a respective header of a tunneling protocol and a respective user data packet, each of the headers indicates a length of the respective user data packet, a first packet data unit of the plural packet data units is arranged first in the datagram and includes the first header as the respective header;

monitor whether a user plane bearer for bearing the datagram is being set up; and indicate, in response to the user plane bearer being set up, in a control message related to the setting up of the user plane bearer, that the apparatus supports the decapsulating.

* * * * *

UNITED STATES PATENT AND TRADEMARK OFFICE
CERTIFICATE OF CORRECTION

PATENT NO. : 10,582,417 B2
APPLICATION NO. : 15/573675
DATED : March 3, 2020
INVENTOR(S) : Giorgi Gulbani and Jan Frey It is certified that error appears in the above-identified patent and that said Letters Patent is hereby corrected as shown below:

In the Claims

Column 26, Line 25, "front" should be deleted and --from-- should be inserted.

Signed and Sealed this
Fifth Day of May, 2020

Andrei Iancu
*Director of the United States Patent and Trademark Office*